(12) United States Patent
Kim

(10) Patent No.: US 11,918,883 B2
(45) Date of Patent: Mar. 5, 2024

(54) ELECTRONIC DEVICE FOR PROVIDING FEEDBACK FOR SPECIFIC MOVEMENT USING MACHINE LEARNING MODEL AND OPERATING METHOD THEREOF

(71) Applicant: IdeaLink Inc., Seoul (KR)

(72) Inventor: Jong Min Kim, Seoul (KR)

(73) Assignee: IdeaLink Inc., Seoul (KR)

( * ) Notice: Subject to any disclaimer, the term of this patent is extended or adjusted under 35 U.S.C. 154(b) by 211 days.

(21) Appl. No.: 17/505,108

(22) Filed: Oct. 19, 2021

(65) Prior Publication Data

US 2022/0126190 A1    Apr. 28, 2022

(30) Foreign Application Priority Data

Oct. 23, 2020 (KR) .................. 10-2020-0138146

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0003* (2013.01); *A63B 69/3623* (2013.01); *G06F 18/214* (2023.01); *G06N 20/00* (2019.01); *G06T 7/73* (2017.01); *G06T 13/40* (2013.01); *G06V 10/40* (2022.01); *G06V 40/23* (2022.01); *A63B 2071/0636* (2013.01); *A63B 2220/05* (2013.01); *A63B 2220/44* (2013.01); *A63B 2220/807* (2013.01); *G06T 2200/24* (2013.01); *G06T 2207/20081* (2013.01); *G06T 2207/30196* (2013.01); *G06T 2207/30221* (2013.01); *G06T 2207/30241* (2013.01)

(58) Field of Classification Search
CPC . A63B 71/0622; A63B 24/0003; G06V 40/23
See application file for complete search history.

(56) References Cited

U.S. PATENT DOCUMENTS 8,616,989 B2 * 12/2013 Bentley ................. A63F 13/213
473/215
10,529,137 B1 * 1/2020 Black ...................... G06T 15/04
(Continued)

FOREIGN PATENT DOCUMENTS

JP    2020-0005192 A    1/2020
KR    10-2020-0022776 A    3/2020
(Continued)

*Primary Examiner* — Seng H Lim
(74) *Attorney, Agent, or Firm* — POLSINELLI PC

(57) ABSTRACT

An operating method of an electronic device includes receiving a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, and executing the program and receiving information on second angular velocity for the specific motion of a user of the electronic device from a swing practice device based on execution of the program.

5 Claims, 11 Drawing Sheets

(51) Int. Cl.
*A63B 69/36* (2006.01)
*G06F 18/214* (2023.01)
*G06N 20/00* (2019.01)
*G06T 7/73* (2017.01)
*G06T 13/40* (2011.01)
*G06V 10/40* (2022.01)
*G06V 40/20* (2022.01)

(56) References Cited

U.S. PATENT DOCUMENTS

| | | | |
|---|---|---|---|
| 10,569,134 B2* | 2/2020 | Vermilyea | A63F 13/211 |
| 10,828,549 B2* | 11/2020 | Li | G06V 20/40 |
| 11,638,853 B2* | 5/2023 | Yang | A63B 24/0006 |
| | | | 434/247 |
| 2019/0224528 A1* | 7/2019 | Omid-Zohoor | A61B 5/6806 |
| 2020/0222757 A1* | 7/2020 | Yang | G09B 5/06 |
| 2021/0245005 A1* | 8/2021 | Pao | A63B 24/0006 |
| 2021/0383101 A1* | 12/2021 | Lee | G06N 20/00 |
| 2022/0262013 A1* | 8/2022 | Decker | G06T 7/20 |
| 2022/0379170 A1* | 12/2022 | Menaker | A63B 24/0087 |

FOREIGN PATENT DOCUMENTS

| | | |
|---|---|---|
| KR | 10-2144634 B1 | 8/2020 |
| KR | 10-2020-0115729 A | 10/2020 |

\* cited by examiner

ELECTRONIC DEVICE FOR PROVIDING FEEDBACK FOR SPECIFIC MOVEMENT USING MACHINE LEARNING MODEL AND OPERATING METHOD THEREOF

CROSS REFERENCE TO RELATED APPLICATIONS

This application claims priority to Application No. 10-2020-0138146 filed in Korea on Oct. 23, 2020, the entire contents of which are hereby incorporated by reference.

BACKGROUND OF THE INVENTION

1. Field of the Invention

The present application relates to an electronic device for providing feedback for specific movement (e.g., a golf swing motion) using a machine learning model, and an operating method thereof.

2. Description of the Related Art

A specific sport, exercise, and/or competition (e.g., golf) requires a specific motion (e.g., golf swing motion), and capital and effort to prepare an environment for practicing the specific motion along with a long learning time are required to master the specific motion.

In addition, as work is frequently performed in a remote manner, it is difficult to learn a specific motion directly face-to-face with an expert (or a professional athlete) of a specific sport, exercise, and/or competition (e.g., golf).

Accordingly, recently, there has been a need for technology for accurately teaching a specific motion (e.g., golf swing) using a remote method while reducing learning tire, capital, and effort required for practice of the specific motion for a specific sport, exercise, and/or competition (e.g., golf).

SUMMARY OF THE INVENTION

Therefore, the present application has been made in view of the above problems, and it is an object of the present application to provide an electronic device and an operating method for accurately learning a specific motion (e.g., golf swing) using a remote method while reducing learning time, capital, and effort by generating a machine learning model based on big data about a specific motion from an expert or a professional athlete of one specific sport and providing a feedback service for the user based on the generated machine learning model.

It is another object of the present application to provide an electronic device and an operating method for accurately learning a specific motion (e.g., golf swing) by receiving feedback for portions of motion desired to be improved from the user during feedback and providing guidance based on the received feedback.

The technical problems solved by the embodiments are not limited to the above technical problems and other technical problems which are not described herein will become apparent to those skilled in the art from the following description.

In accordance with an aspect of the present application, the above and other objects can be accomplished by the provision of an operating method of an electronic device, including receiving a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, the plurality of pieces of evaluated information including information on evaluation levels for a plurality of respective features associated with the specific motion, and the machine learning model being set to output first evaluation levels for the plurality of features associated with the specific motion in response to input of at least one of information on a first skeleton or information on first angular velocity, executing the program and receiving information on second angular velocity for the specific motion of a user of the electronic device from a swing practice device based on execution of the program, photographing the specific motion of the user based on execution of the program and acquiring information on a second joint during the specific motion of the user based on a plurality of images acquired based on the photographing, displaying a 3D graphical user interface (GUI) including a 3D animation object based on the information on the second angular velocity and/or the information on the second joint, and displaying information on second evaluation levels on the plurality of features associated with the specific motion output from the machine learning model on the 3D GUI in response to input of the information on the second angular velocity and/or the information on the second joint to the machine learning model.

In accordance with another aspect of the present application, there is provided an electronic device including a communication circuit, and at least one processor, wherein the at least one processor is configured to receive a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, the plurality of pieces of evaluated information including information on evaluation levels for a plurality of respective features associated with the specific motion, and the machine learning model being set to output first evaluation levels for the plurality of features associated with the specific motion in response to input of at least one of information on a first skeleton or information on first angular velocity, to execute the program and to receive information on second angular velocity for the specific motion of a user of the electronic device from a swing practice device based on execution of the program, to photograph the specific motion of the user based on execution of the program and to acquire information on a second joint during the specific motion of the user based on a plurality of images acquired based on the photographing, to display a 3D graphical user interface (GUI) including a 3D animation object based on the information on the second angular velocity and/or the information on the second joint, and to display information on second evaluation levels on the plurality of features associated with the specific motion output from the machine learning model on the 3D GUI in response to input of the information on the second angular velocity and/or the information on the second joint to the machine learning model.

The objects of the present application are not limited to the aforementioned objects, and other objects not mentioned will be clearly understood by those of ordinary skill in the art to which the present application pertains from the following description.

BRIEF DESCRIPTION OF THE DRAWINGS

The above and other objects, features and other advantages of the present application will be more clearly understood from the following detailed description taken in conjunction with the accompanying drawings, in which.

DETAILED DESCRIPTION OF THE INVENTION

Figure 1:
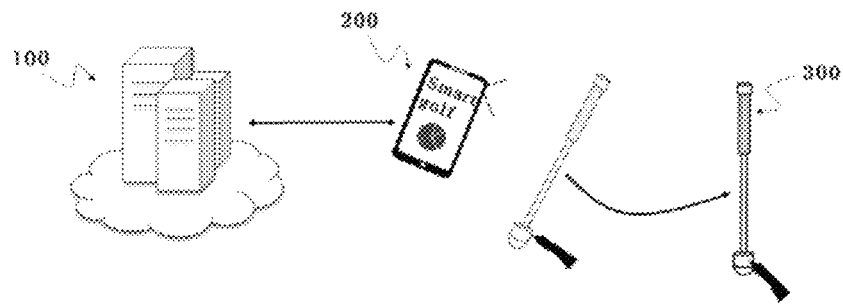
FIG. 1 is a diagram for explaining an example of devices included in a smart practice system according to an embodiment of the present application.

According to an embodiment of the present application, an operating method of an electronic device may include receiving a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, the plurality of pieces of evaluated information including information on evaluation levels for a plurality of respective features associated with the specific motion, and the machine learning model being set to output first evaluation levels for the plurality of features associated with the specific motion in response to input of at least one of information on a first skeleton or information on first angular velocity, executing the program and receiving information on second angular velocity for the specific motion of a user of the electronic device from a swing practice device based on execution of the program, photographing the specific motion of the user based on execution of the program and acquiring information on a second joint during the specific motion of the user based on a plurality of images acquired based on the photographing, displaying a 3D graphical user interface (GUI) including a 3D animation object based on the information on the second angular velocity and/or the information on the second joint, and displaying information on second evaluation levels on the plurality of features associated with the specific motion output from the machine learning model on the 3D GUI in response to input of the information on the second angular velocity and/or the information on the second joint to the machine learning model.

According to an embodiment of the present application, when the specific motion is a golf swing, the plurality of features may include at least one of a grip type, address, back swing cocking, down swing, impact, follow swing, or follow top.

According to an embodiment of the present application, the operating method may further include determining whether a time period in which a trajectory of the golf swing is interrupted occurs based on a comparison result of the plurality of images acquired based on the photographing, and displaying a message for re-photographing the golf swing upon determining that the time period in which the trajectory of the golf swing is interrupted occurs.

According to an embodiment of the present application, the operating method may further include extracting an image of the user from the plurality of images, generating a skeleton model of the user based on the image of the user, and extracting information on a position of at least some joints associated with the golf swing among a plurality of joints included in the skeleton model, the at least some joints including joints of head, both shoulders, waist, and both knees among the plurality of joints.

According to an embodiment of the present application, the operating method may further include extracting feature information associated with the user from the plurality of images, and generating a 3D avatar corresponding to the user based on the extracted feature information, generating motion information of the 3D avatar based on the information on a position of the second joint, the motion information of the 3D avatar is information for controlling each joint of the 3D avatar to move at a predetermined speed in a predetermined direction during a predetermined time, calculating information on a trajectory of the golf swing based on the information on the second angular velocity and generating swing trajectory animation information based on the information on the trajectory of the golf swing, and generating the 3D animation object including the 3D avatar to which the motion information is applied and the swing trajectory animation information.

According to an embodiment of the present application, the operating method may further include acquiring contextual information, and applying the contextual information to features of components included in the 3D graphical user interface (GUI), the contextual information including at least one of weather or time.

According to an embodiment of the present application, the operating method may further include, while displaying information on second evaluation levels on the plurality of features, receiving input for changing a third evaluation level to a fourth evaluation level for one feature among the plurality of features, and changing the 3D animation object to a first 3D animation object based on the input for changing and displaying the first 3D animation object.

According to an embodiment of the present application, the operating method may further include identifying the swing trajectory animation information corresponding to the one feature to be changed among the motion information associated with the 3D animation object and the swing trajectory animation information, changing the identified swing trajectory animation information to first swing trajectory animation information based on the changed fourth evaluation level, and generating the first 3D animation object based on the motion information and the first swing trajectory animation information.

According to an embodiment of the present application, the operating method may further include identifying information on a first time period in which the first swing trajectory and the second swing trajectory are different based on a comparison result between the first swing trajectory based on the 3D animation object and the second swing trajectory based on the first 3D animation object, and transmitting information on the first time period to the swing practice device, wherein the swing practice device is configured to provide sound or vibration during the first time period.

According to an embodiment of the present application, an electronic device includes a communication circuit, and at least one processor, wherein the at least one processor is configured to receive a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, the plurality of pieces of evaluated information including information on evaluation levels for a plurality of respective features associated with the specific motion, and the machine learning model being set to output first evaluation levels for the plurality of features associated with the specific motion in response to input of at least one of information on a first skeleton or information on first angular velocity, to execute the program and to receive information on second angular velocity for the specific motion of a user of the electronic device from a swing practice device based on execution of the program, to photograph the specific motion of the user based on execution of the program and to acquire information on a second joint during the specific motion of the user based on a plurality of images acquired based on the photographing, to display a 3D graphical user interface (GUI) including a 3D animation object based on the information on the second angular velocity and/or the information on the second joint, and to display information on second evaluation levels on the plurality of features associated with the specific motion output from the machine learning model on the 3D GUI in response to input of the information on the second angular velocity and/or the information on the second joint to the machine learning model.

According to various embodiments, it would be obvious to those of ordinary skill in the art to which the present application pertains that the embodiments described in the specification are for clearly explaining the idea, and thus the present application is not limited by the embodiments described in the specification, and according to various embodiments, the scope of the present application should be construed to include modifications or variations without departing from the spirit according to various embodiments.

The terms used in the specification are defined in consideration of functions used in the present application, and can be changed according to the intent, conventionally used methods of operators, or advent of new technologies. In specific cases, the terms can be selected by an application. In this case, the meanings of the terms will be described in a corresponding embodiment. Accordingly, definitions of the terms should be understood on the basis of the substantial meaning and the entire description of the specification instead of simple names of the terms.

The drawings attached to the specification are for easily explaining the present application, and according to various embodiments, shapes shown in the drawings may be exaggerated as needed to aid in understanding of the embodiments, and thus the present application is not limited by the drawings.

In the following description of the present disclosure, a detailed description of known functions and configurations incorporated herein will be omitted when it may make the subject matter of the present disclosure unclear.

The various embodiments of the present disclosure and the terms used therein are not intended to limit the technical features described in the present disclosure to specific embodiments, and should be understood to include various modifications, equivalents, or substitutions of the embodiments. With regard to the description of the drawings, like reference numerals may be used for similar or related components. An expression in the singular encompasses the expression in the singular or the plural, unless it has a clearly different meaning in context. The expressions used in the present disclosure, such as "A or B", "at least one of A and B", "at least one of A or B," "A, B, or C," "at least one of A, B, and C,", and "at least one of A, B, or C" may include any and all combinations of one or more of the associated listed items. Terms, such as "first" or "second" used in the present disclosure may be used to distinguish the relevant elements from other elements and are not limited by other aspects (e.g., importance or order). When it is said that one (e.g., first) component is "coupled" or "connected" to another (e.g., second) component with or without the terms "functionally" or "communicatively", it means that one component can be connected to the other component directly (e.g., by wire), wirelessly, or through a third component.

As used herein, the term "module" may include a unit configured in hardware, software, or firmware and may be used interchangeably with terms, for example, logic, logic block, component, or circuit. A module may be an integrally configured component or a minimum unit of the component or a part thereof for performing one or more functions. For example, according to an embodiment, the module may be configured in the form of an application specific integrated circuit (ASIC).

The various embodiments of the present disclosure may be implemented by software (e.g., a program 140) including one or more commands stored in a storage medium (e.g., a built-in memory 136 or an external memory 138) that is readable by a machine (e.g., an electronic device 101). For example, a processor (e.g., a processor 120) of the machine (e.g., the electronic device 101) may call at least one of one or more commands stored in the storage medium and may execute the called command. This may allow the machine to be operated to perform at least one function according to the called at least one command. The one or more commands may include code generated by a complier or code to be executed by an interpreter. The storage medium readable by the machine may be provided in the form of a non-transitory storage medium. Here, the term "non-transitory" only means that a storage medium is a tangible device and contains no signal (e.g., electromagnetic waves) and does not distinguish between the case in which data is semi-permanently stored in the storage medium and the case in which data is temporarily stored in the storage medium.

According to an embodiment, a method according to various embodiments of the present disclosure may be contained in a computer program product and may be provided. The computer program product may be traded between a seller and a buyer as a commodity. The computer program product may be distributed in the form of a storage medium (e.g., a compact disc read only memory (CD-ROM)) readable by a machine or may be distributed (e.g., download or upload) directly or online through an application store (e.g., Playstore™) or between two user devices (e.g., smart phones). In the case of online distribution, at least a portion of the computer program product may be at least temporarily stored in a machine-readable storage medium such as a memory of a server of a manufacturer, a server of an application store, or a relay server or may be temporarily generated.

According to various embodiments, each component (e.g., a module or a program) of the aforementioned components may include a single object or a plurality of devices. According to various embodiments, one or more of the aforementioned corresponding components or operations may be omitted or one or more other components or operations may be added. Alternatively or additionally, a plurality of components (e.g., a module or a program) may be integrated into one component. In this case, the integrated component may perform one or more functions of each of the plurality of components in the same or similar way as in the case in which the functions are performed by a corresponding component of the plurality of components prior to integration. According to various embodiments, operations performed by a module, a program, or other components may be sequentially, in parallel, iteratively, or heuristically performed, one or more of the operations may be performed in a different order or omitted, or one or more other operations may be added.

1. Smart Practice System Based on Machine Learning Model

Hereinafter, a smart practice system according to an embodiment of the present application will be described.

In the specification, the smart practice system way be defined as a system for remote evaluation of a specific motion (e.g., swing) used in a sport, exercise, and/or competition of a specific sport (e.g., golf and yoga). For example, the smart practice system way be defined as a system that acquires a practice image and/or a practice video when a user practices a specific motion (e.g., swing) with respect to a sport, exercise, and/or competition of a specific sport (e.g., golf and yoga), analyzes the practice image and/or the practice video in a remote manner based on big data and/or a machine learning model, and provides professional feedback. The smart practice system may accumulate big data about a specific motion (or movement) (e.g., a golf swing motion) from an expert (or a professional athlete) (e.g., a golf player) of a sport, exercise, and/or competition of a specific sport, may evaluate the specific motion (or movement) of the user, on which the user wants to receive feedback, based on the big data, and may provide the evaluated information. In order to effectively provide the evaluated information, the smart practice system may implement a 3D object indicating a specific motion (or movement) (e.g., a golf swing motion) of the user and may display evaluated information (e.g., an evaluation score for each swing trajectory or each swing-related feature (e.g., a grip type or an address)) of the specific motion (or movement) of the user around the implemented 3D object. The smart practice system may receive information on some motions that the user wants to improve among specific motions (or movement) from the user and may provide guide information (e.g., a changed swing trajectory) for improving some motions (or movement) of the user based on the received information.

Hereinafter, the smart practice system will be described in more detail.

2. Configuration of Smart Practice System

FIG. 1 is a diagram for explaining an example of devices included in a smart practice system according to an embodiment of the present application.

Referring to FIG. 1, the smart practice system may include a server 100, an electronic device 200, and a swing practice device 300. The smart practice system may be appropriately configured as a system type system or an on-device type system, which will be described in the section "2.4".

According to an embodiment of the present application, the server 100 may accumulate big data about a specific motion (or movement) (e.g., a golf swing motion) from an expert (or a professional athlete) (e.g., a golf player) of a sport, exercise, and/or competition of a specific sport. The server 100 may generate a machine learning model for evaluating a specific motion of a sport, exercise, and/or competition of a specific sport of the user based on the big data. The server 100 may transfer a program including the machine learning model to the electronic device 200 of the user and may allow the program to provide a 3D interface for providing evaluated information on the user based on the transferred program.

According to an embodiment of the present application, the electronic device 200 may include various types of electronic devices, which are capable of communicating with the server 100 and being used by a user. For example, the electronic device 200 may include personal terminals (e.g., a smartphone), electronic devices (e.g., a PC) disposed at a fixed position, a mobile personal notebook computer, and a smart virtual reality (VR)/augmented reality (AR) glass. The user may access the aforementioned server 100 using the electronic device 200 and may receive a program for evaluation of motion or movement of a sport, exercise, and/or competition of a specific sport of the user from the server 100. The electronic device 200 may photograph the motion or movement of the user based on the received program and may analyze information on the positions of joints during the motion or movement of the user from the captured image. The electronic device 200 may receive information on an angular velocity based on movement of the swing practice device 300 based on the received information and may calculate information on a movement trajectory of the swing practice device 300 based on the received information on the angular velocity.

According to an embodiment of the present application, the swing practice device 300 may have a shape of an instrument and/or tool used in a sport, exercise, and/or competition (e.g., golf) of a specific sport and may include various sensors for detecting a movement trajectory when being moved by the user. The swing practice device 300 may communicate with the electronic device 200 of the user and may transmit, to the electronic device 200, information (e.g., angular velocity information) detected by various sensors for calculating the movement trajectory of the swing practice device 300 in real time when being used by the user.

The smart practice system may also be implemented to include a greater or smaller number of devices without being limited to the devices included in the smart practice system shown in FIG. 1.

2.1. Example of Configurations of Server 100

Hereinafter, an example of configurations for performing an operation of the server 100 will be described.

Figure 2:
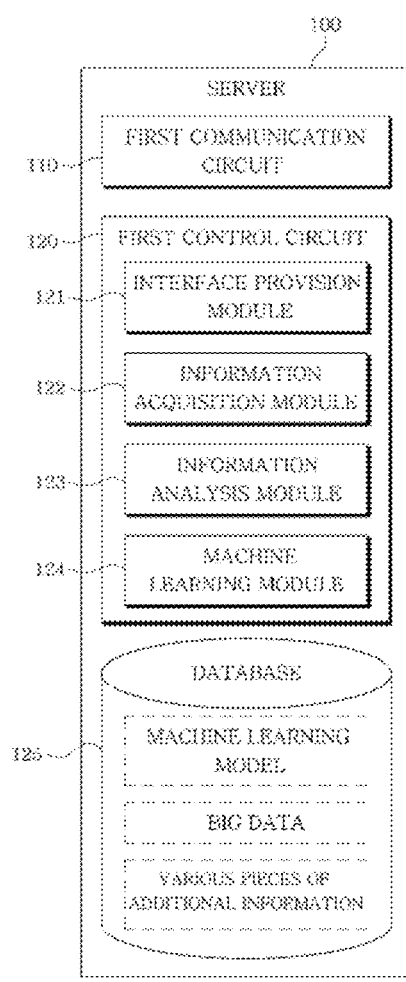
FIG. 2 is a block diagram showing an example of a server according to an embodiment of the present application.

FIG. 2 is a block diagram showing an example of the server 100 according to an embodiment of the present application. The server 100 may include a smaller or greater number of components than the illustrated components without being limited to FIG. 2. For example, the electronic device 200 may further include at least one component (e.g., a machine learning module 124) included in the server 100 that will be described below and may be implemented to perform an operation of generating a machine learning model based on big data.

Modules (e.g., an interface provision module 121) included in a first control circuit 120 of the server 100 that will be described below may be controlled to perform an operation associated with the module by the first control circuit 120. In other words, the modules may be implemented using a program, computer readable code, and a process and instructions for performing the operation associated with the module, and when the modules are executed by the first control circuit 120, the first control circuit 120 may be controlled to perform the operation associated with the module.

Referring to FIG. 2, the server 100 according to an embodiment may include a first communication circuit 110, the first control circuit 120 including an interface provision module 121, an information acquisition module 122, an information analysis module 123, and the machine learning module 124, and a database 125.

The first communication circuit 110 may communicate with an external machine. For example, the first communication circuit 110 may be connected to a network through wireless communication or wired communication to set communication with an external device (e.g., the server 100 or the electronic device 200) and may transmit and/or receive predetermined information. Wireless communication may include cellular communication using at least one of, for example, LTE, LTE Advance (LTE-A), code division multiple access (CDMA), wideband CDMA (WCDMA), universal mobile telecommunications system (UMTS), Wireless Broadband (WiBro), or Global System for Mobile Communications (GSM). According to an embodiment, wireless communication may include at least one of, for example, Wi-Fi, Bluetooth, Bluetooth low energy (BLE), Zigbee, near field communication (NFC), Magnetic Secure Transmission, radio frequency (RF), or body area network (BAN). According to an embodiment, wireless communication may include GNSS. GNSS may be, for example, Global Positioning System (GPS), Global Navigation Satellite System (Glonass), Beidou Navigation Satellite System (hereinafter, "Beidou"), or Galileo, the European global satellite-based navigation system. Hereinafter, in the present disclosure, "GPS" may be used interchangeably with the "GNSS". Wired communication may include at least one of, for example, universal serial bus (USB), high definition multimedia interface (HDMI), recommended standard 232 (RS-232), power line communication, or plain old telephone service (POTS). A network 162 may include at least one type of telecommunication network, for example, a computer network (e.g., a LAN or a WAN), the Internet, or a telephone network.

The first control circuit 120 may control the overall operation of the server 100. To this end, the first control circuit 120 may calculate and process various pieces of information and may control operations of components (e.g., the first communication circuit 110) of the server 100. The first control circuit 120 may be configured as a computer or a device similar thereto using hardware, software, or a combination thereof. In terms of hardware, the first control circuit 120 may process an electrical signal and may provide the processed electrical signal in the form of an electronic circuit (e.g., CPU) for performing a control function, and in terms of software, may provide the processed electrical signal in the form of a program for driving the first control circuit 120 as hardware. Unless the context clearly indicates otherwise in the following description, the operation of the server 100 may be interpreted as being performed under control of the first control circuit 120.

The first control circuit 120 may include the interface provision module 121, and the interface provision module 121 may provide an interface for using the server 100 to electronic devices (e.g., 200) connected to the server 100. Thus, the electronic devices (e.g., 200) may display the interface and may receive a program containing a machine learning model to be described below, stored in the server 100, through the displayed interface. In this case, the interface provision module 121 may authenticate the connected electronic device 200 of the user based on various pieces of additional information (e.g., account information) associated with the user, which is stored in a memory, and may also perform control to download the program when authentication is completed.

The first control circuit 120 may include the information acquisition module 122, and the information acquisition module 122 may acquire big data about a specific motion or movement (e.g., swing motion) of a plurality of experts (or a professional athlete) (e.g., golf player) of a sport, exercise, and/or competition of a specific sport in the server 100. For example, the big data may include an image of the specific motion or movement of the plurality of experts, information on the angular velocity using the swing practice device 300 during the specific motion or movement. The information acquisition module 122 may receive information on a specific motion or movement (e.g., swing motion) of a plurality of experts (or a professional athlete) (e.g., a golf player)

from each of personal electronic devices (e.g., a terminal or a PC) of a plurality of experts that access the server 100.

The first control circuit 120 may include the information analysis module 123, and the information analysis module 123 may analyze and process big data acquired by the information acquisition module 122 as data for machine learning. For example, the information analysis module 123 may extract information on the positions of skeletons during a specific motion of an expert based on an image the specific motion (e.g., swing) of the expert acquired by the information acquisition module 122. For example, the information analysis module 123 may acquire information on a trajectory of the specific motion based on the acquired information on the angular velocity of the specific motion (e.g., swing) of the expert. Without being limited to the description, the information acquisition module 122 may also directly acquire information on a skeleton during the specific motion and/or information on the trajectory of the specific motion from a plurality of experts without implementation of the information analysis module 123.

The first control circuit 120 may include the machine learning module 124, and the machine learning module 124 may generate a machine learning model for evaluating a specific motion or movement of the user of the server 100 based on the result information obtained by analyzing the big data of the specific motion or movement (e.g., swing motion) of a plurality of experts (or a professional athlete) (e.g., a golf player) for a sport, exercise, and/or competition of a specific sport by the information analysis module 123. The generated machine learning model may be configured to output evaluated information of a plurality of features (e.g., a grip type or an address) of the specific motion in response to input of information on a plurality of joints and/or information on a trajectory (e.g., a swing trajectory) of motion during the specific motion or the movement (e.g., swing) of the user. The operation of generating the machine learning model based on the machine learning module 124 and the machine learning model will be described below with reference to FIGS. 5 to 7.

The database 125 may store various pieces of information (e.g., a machine learning model, big data received from an expert, and various pieces of additional information such as user information). The database may temporarily or semi-permanently store data. For example, the database 125 of the server 100 may store an operating program (operating system (OS)) for driving the server 100, data for hosting a website, data about a program and an application (e.g., a web application), or the like. An example of the database 125 may include hard disk drive (HDD), solid state drive (SSD), flash memory, read-only memory (ROM), and random access memory (RAM). The database may be provided as a built-in type or a removable type.

2.2 Example of Configuration of Electronic Device 200

Hereinafter, an example of the configuration of the electronic device 200 will be described.

Figure 3:
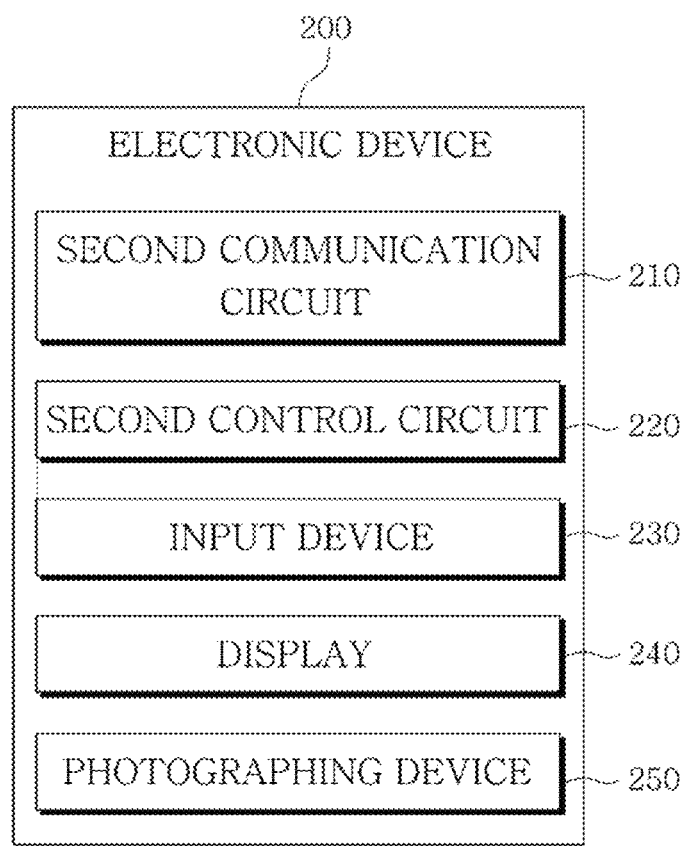
FIG. 3 is a block diagram showing an example of an electronic device according to an embodiment of the present application.

FIG. 3 is a block diagram showing an example of the electronic device 200 according to an embodiment of the present application. Without being limited to FIG. 3, the electronic device 200 may include a greater or smaller number of components than the illustrated components. For example, the electronic device 200 may include at least one component (e.g., the machine learning module 124) included in the server 100 and may be configured to perform the operation of generating a machine learning model based on big data.

Referring to FIG. 3, the electronic device 200 according to an embodiment may include a second communication circuit 210, a second control circuit 220, an input device 230, a display 240, and a photographing device 250.

The second communication circuit 210 may set communication with external devices (e.g., the server 100). The second communication circuit 210 may set communication and connection with the server 100 to access the server 100 and may download (or receive) a program for evaluating a specific motion of exercise (e.g., golf) of a specific sport of the user from the server 100. The second communication circuit 210 may be configured like the aforementioned first communication circuit 110 of the server 100, and thus a repeated description thereof is omitted.

The second control circuit 220 may control the overall operation of the electronic device 200. The second control circuit 220 may be configured like the first control circuit 120 of the electronic device 200, and thus a repeated description thereof is omitted.

The input device 230 may receive information from the user. The input device 230 may be various interfaces, a connection port, or the like for receiving user input or outputting information to the user. The input device 230 may be divided into an input module and an output module and the input module may receive user input from the user. The user input may include various types of information such as key input, touch input, and voice input. An example of the input module for receiving the user input may be a comprehensive concept including not only a typical type of keypad, keyboard, or mouse but also a touch sensor for detecting user touch, a microphone for receiving a voice signal, a camera for recognizing a gesture through image recognition, a proximity sensor including an illumination sensor, an infrared sensor, or the like for detecting user access, a motion sensor for recognizing a user motion through an acceleration sensor, a gyro sensor, or the like, and various types of input devices for detecting or receiving various other types of user input. Here, the touch sensor may be configured as a piezoelectric or capacitive touch sensor for detecting touch through a touch panel or a touch film attached to a display panel, an optical touch sensor for detecting touch using an optical method, or the like. In this case, the input device 230 may be configured in the display 240 to be described below to receive touch input of the user. In other words, the display 240 may include a touchscreen as the input device 230 and may receive, for example, touch, gesture, proximity, or hovering input using an electronic pen or a part of the user's body. In addition, the input device 230 may also be configured in the form of an input interface (a USB port or a PS/2 port) for connection with an external input device for receiving user input instead of a device for autonomously detecting the user input.

The display 240 may include a liquid crystal display (LCD), a light-emitting diode (LED) display, an organic light-emitting diode (OLED) display, a microelectromechanical system (MEMS) display, or an electronic paper display. The display 240 may display an interface for topic writing and may display a recommendation sentence on the interface.

The photographing device 250 may photograph a specific motion of the user. The photographing device 250 may include a plurality of image sensors including a charge-coupled device (CCD) or a complementary metal oxide semiconductor (CMOS) and may receive light and convert the amount of received light into electrical information for each pixel during photographing.

2.3 Example of Configuration of Swing Practice Device 300

Hereinafter, an example of the configuration of the swing practice device 300 will be described.

Figure 4:
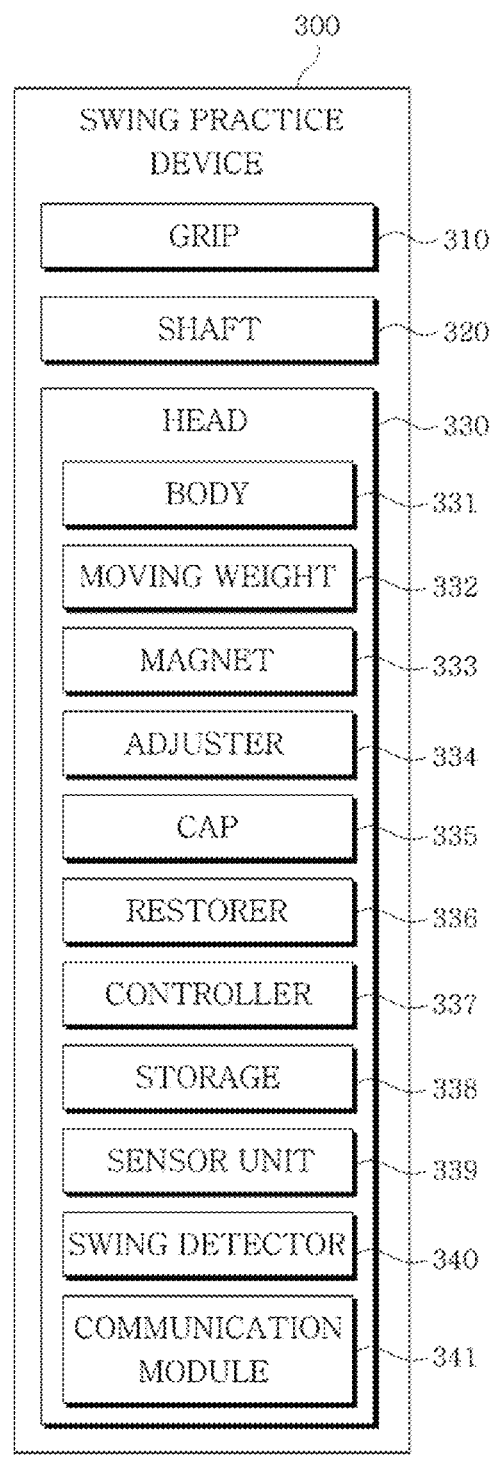
FIG. 4 is a block diagram showing an example of a swing practice device according to an embodiment of the present application.

FIG. 4 is a block diagram showing an example of the swing practice device 300 according to an embodiment of the present application. Without being limited to FIG. 4, the swing practice device 300 may include a greater or smaller number of components than the illustrated components.

Referring to FIG. 4, the swing practice device 300 may include a grip 310, a shaft 320, and a head 330. The head 330 may include at least one of a body 331, a moving weight 332, a magnet 333, an adjuster 334, a cap 335, a restorer 336, a controller 337, a storage 338, a sensor unit 339, a swing detector 340, or a communication module 341.

The grip 310 way indicate a portion to be gripped by a user who uses the swing practice device 300. The grip 310 may be positioned at one end of a shaft 320. The shaft 320 may be positioned in a direction passing through the grip 310 and the head 330. The swing detector 340 for measuring a swing angular velocity to be described below may be configured in the grip 310.

The head 330 may be positioned at one end of the shaft 320 at an opposite side to the grip 310. The body 331 included in the head 330 may include at least one of the moving weight 332, the magnet 333, the adjuster 334, the cap 335, the restorer 336, the controller 337, the storage 338, the sensor unit 339, the swing detector 340, and the communication module 341, which are positioned in the body 331.

The moving weight 332 may be built in the body 331 of the head 330. The moving weight 332 may move along a sliding space in the body 331. Because the restorer 336 is installed on a side surface of the moving weight 332, when the user swings while holding the grip 310, the moving weight 332 may be moved by centrifugal force while compressing the restorer 336 and may hit an internal cap 104 in a space to produce a hitting sound.

After hitting, the moving weight 332 may collide with the magnet 333 while being restored by elastic force of the compressed restorer 336 to produce the hitting sound indicating that motion is completed.

The magnet 333 may be used to fix the moving weight 332. In detail, the magnet 333 may be used to determine a limit for separating the moving weight 332 attached to the magnet 333 from the magnet 333 using centrifugal force generated by swing motion, that is, limit centrifugal force. The adjuster 334 may adjust the limit for separating the moving weight 332 attached to the magnet 333 from the magnet 333 using centrifugal force generated by swing motion. In a procedure of adjusting the limit, the adjuster 334 in contact with the body 331 way be rotated in the body 331. The adjuster 334 way vary a distance between the moving weight 332 and the magnet 333 installed in the body 331 through the procedure. That is, when the adjuster 334 is rotated clockwise to be retracted, the moving weight 332 may be moved away from the magnet 333 fixed to the body 331 to be moved away from the range of magnetic force, and thus force for attracting the moving weight 332 may be reduced, and the moving weight 332 may be moved toward the cap 335 using only small centrifugal force. In contrast, when the adjuster 334 is rotated counterclockwise to move the moving weight 332 toward the magnet 333, as the moving weight 332 gets closer to the magnet 333, magnetic force may become stronger, larger centrifugal force may be required to separate the moving weight 332 from the magnet 333, and faster swing may be needed to separate the moving weight 332 to produce a hitting sound. The cap 335 may produce a sound when swing is performed using centrifugal force equal to or greater than a predetermined reference. When the moving weight 332 is separated from the magnet 333 by centrifugal force due to swing to collide with the cap 335, a hitting sound may be produced. The hitting sound is similar to the hitting sound that occurs when a golf ball is hit, making it feel like hitting a golf ball. The restorer 336 may restore the moving weight 332 to an original position when centrifugal force is removed after hitting. Due to elasticity of the restorer 336 and magnetic force of the magnet 333, the moving weight 332 may return to a position close to the magnet 333 again. The moving weight 332 may produce a hitting sound indicating that motion is completed by hitting the magnet 333 while being restored by elastic force of the restorer 336. The controller 337 may control at least one of the storage 338, the sensor unit 339, the swing detector 340, or the communication module 341.

The storage 338 may store data acquired from the sensor unit 339 and the swing detector 340. The storage 338 may store swing trajectory data for tracking a swing trajectory of the swing practice device 300, swing speed data for digitizing swing speed of the swing practice device 300, and the swing detector 340 may store at least one of swing acceleration data for digitizing swing acceleration of the swing practice device 300 or level data of the adjuster 334. The sensor unit 339 may acquire level data of the adjuster 334.

According to an embodiment, the sensor unit 339 may acquire level data of the adjuster 334 through a sensor for recognizing an interval between the magnet 333 and the moving weight 332. According to another embodiment, the sensor unit 339 may acquire level data of the adjuster 334 through a sensor for measuring magnetic strength of the magnet 333. According to another embodiment, the sensor unit 339 may acquire level data of the adjuster 334 through a sensor for recognizing change in a resistance value of the adjuster 334.

The swing detector 340 may detect swing trajectory data for tracking a swing trajectory of the swing practice device 300. In detail, the swing detector 340 may be installed in or attached to a side of the head 330 of the swing practice device 300 and may detect swing trajectory data of the head 330. For example, when the user practices their swing using the swing practice device 300, a trajectory of the head 330 of the swing practice device 300 may be tracked. The swing detector 340 may detect swing angular velocity data for digitizing swing angular velocity of the swing practice device 300. For example, the swing detector 340 way be a 9-axis capstone measuring sensor and may detect angular velocity data in 9 axial directions. The communication module 341 may transmit swing trajectory data for tracking a swing trajectory of the swing practice device 300 and swing speed data for digitizing swing speed of the swing practice device 300 to the electronic device 200 of the user, and the swing detector 340 may transmit at least one of swing angular velocity data for digitizing swing angular velocity of the swing practice device 300 or level data of the adjuster 334 to the electronic device 200 of the user.

2.4. Example of Configuration of Smart Practice System

As described above, the smart practice system may be configured as a system type or an on-device type.

As described above, according to an embodiment, when the smart practice system includes the server 100 and the electronic device 200, the smart practice system may be defined as a system type. In other words, the system-type system may be a system in which accumulation of data and generation of a machine learning model 330 are performed by one component (e.g., the server 100) and a service (e.g., provision of feedback for motion of the user) using the same is performed by another component (e.g., the electronic device 200). In this case, the server 100 may provide a program including the generated machine learning model to the electronic device 200, and the electronic device 200 may execute the program and may use the machine learning model.

According to another embodiment, when the aforementioned components are configured as one physical device, the smart practice system may be defined as an on-device type. For example, components of the server 100 may be configured in the electronic device 200, and in this case, the smart practice system may be defined as an on-device type. In this case, the electronic device 200 may autonomously generate the machine learning model and may perform a service (e.g., provision of feedback for a swing motion) based on the machine learning model.

Without being limited to the description, the smart practice system may be configured as a hybrid type formed by combining the system type and the on-device type. For example, the smart practice system may be defined as a hybrid type in which at least one component (e.g., the machine learning module 124) of the server 100 is configured in the electronic device 200 and other components (e.g., the database 125) are configured in the server 100.

3. Operation of Smart Practice System

Hereinafter, various examples of operations of devices (e.g., the server 100, the electronic device 200, and the swing practice device 3001 included in the smart practice system will be described.

3.1. First Embodiment <Operation of Generating Machine Learning Model for Providing Evaluated Information of Specific Motion or Movement>

According to an embodiment, the server 100 may accumulate big data of an expert for a specific motion in a sport, exercise, and/or competition of a specific sport (e.g., golf, yoga) and may normalize and/or process the accumulated big data as data for generating the machine learning model. The server 100 may perform machine learning based on the processed data to generate the machine learning model and may provide the machine learning model to the electronic device 200 of a user who wants to receive a service (e.g., evaluation of a specific motion of a specific sport) in the future.

Figure 5:
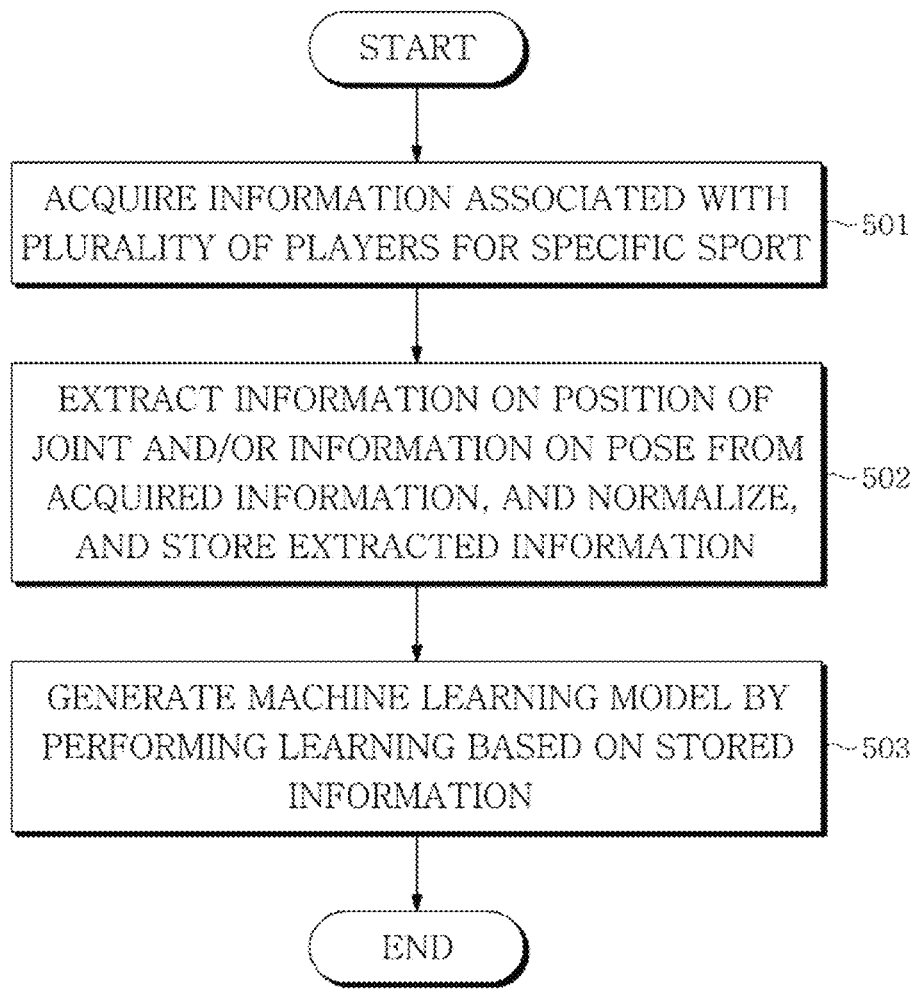
FIG. 5 is a flowchart for explaining an example of an operation of a server according to an embodiment of the present application.

FIG. 5 is a flowchart for explaining an example of an operation of the server 100 according to an embodiment of the present application. According to various embodiments, operations of the server 100 are not limited to the operations illustrated in FIG. 5 and may be performed in a different order from the illustrated order. According to various embodiments, a greater or smaller number of operations may be performed than the operations of the smart practice system shown in FIG. 5 or at least one operation may be performed. Hereinafter, FIG. 5 will be described with reference to FIGS. 6 to 7.

Figure 6:
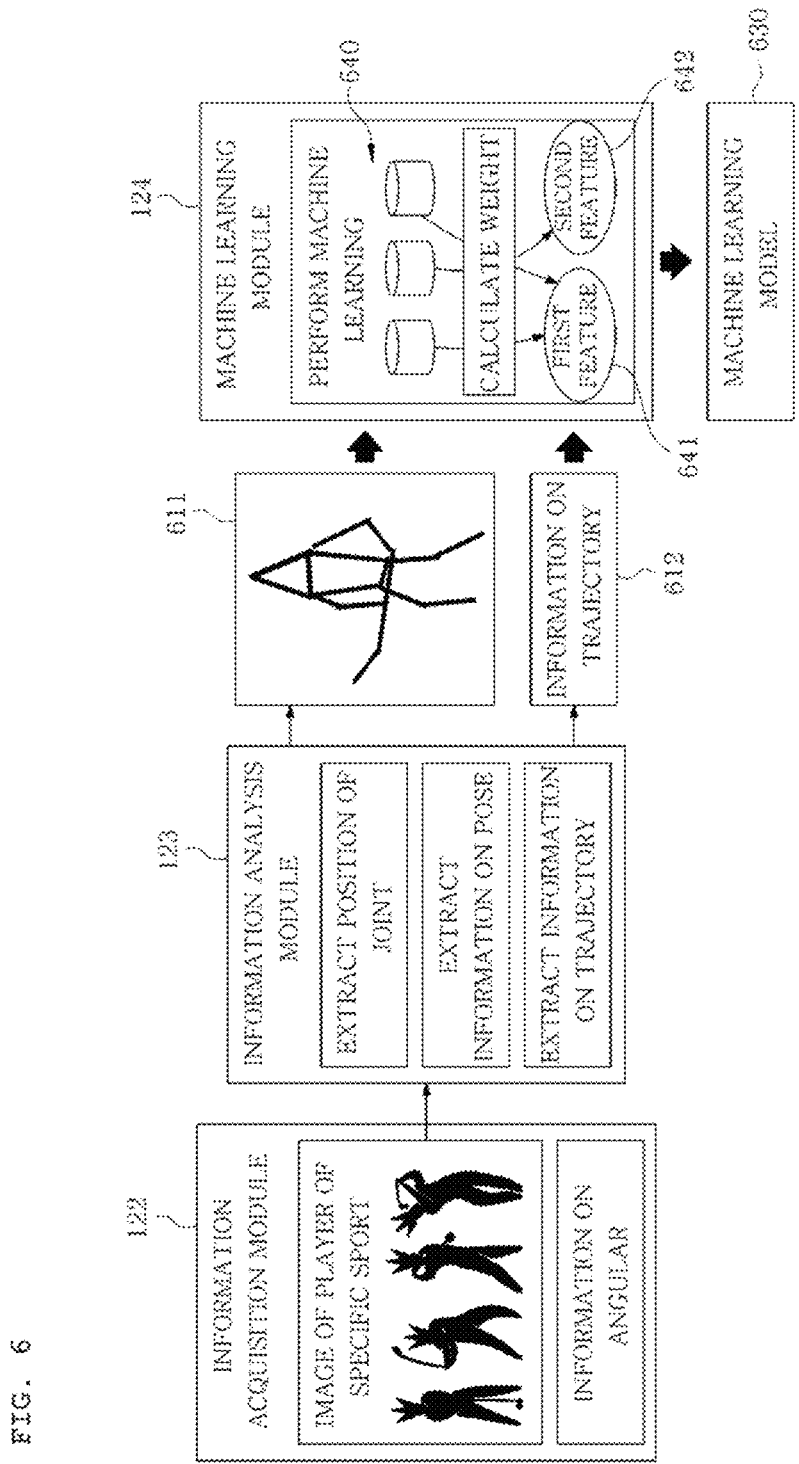
FIG. 6 is a diagram for explaining an operation of generating a machine learning model for evaluating a specific motion required in a sport, exercise, and/or competition of a specific sport (e.g., golf and yoga) of a server according to an embodiment of the present application.
Figure 7:
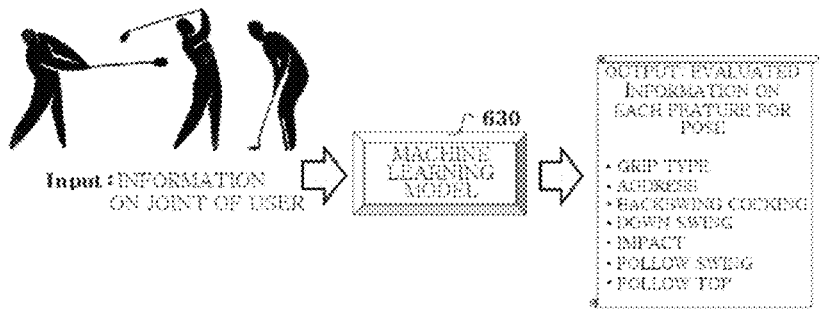
FIG. 7 is a diagram for explaining an example of a generated machine learning model according to an embodiment of the present application.

FIG. 6 is a diagram for explaining an operation of generating a machine learning model for evaluating a specific motion required in a sport, exercise, and/or competition of a specific sport (e.g., golf and yoga) of the server 100 according to an embodiment of the present application. FIG. 7 is a diagram for explaining an example of a generated machine learning model according to an embodiment of the present application.

According to an embodiment, the server 100 may acquire information associated with a plurality of players for a specific sport in operation 501. For example, the server 100 may receive information on a specific motion (or movement) (e.g., golf swing motion) from an expert (or a professional athlete) (e.g., a golf player) of a sport, exercise, and/or competition of a specific sport and may accumulate the received information. The server 100 (e.g., the information acquisition module 122) may make a request to experts (or professional athletes) for respective sports for information on a specific motion and may receive the information from an electronic device of the experts. The information received from the experts may include an image or video of the specific motion or movement (e.g., swing motion), Information on angular velocity detected by the swing practice device 300 (e.g., detected by the swing detector 340) during the specific motion or movement (e.g., swing motion) of the expert, and evaluated information, as shown in FIG. 6. The evaluated information may include evaluated information of the specific motion of the expert for the specific motion of the expert. For example, when the specific motion is golf swing, the expert may leave the comment "Grip is strong, the address is normal, and the following swing is suitable" about the specific motion after the specific motion. For example, the expert may leave an evaluation comment about features including a grip type, address, back swing cocking, down swing, impact, follow swing, and follow top. The server 100 may receive the command left by the expert together with the aforementioned image of the expert and the information on angular velocity as the evaluated information. In this case, the server 100 may provide an interface for receiving information (e.g., an image or video, angular velocity, or evaluated information) using the aforementioned interface provision module 121 and may upload information through the interface.

According to an embodiment, the server 100 may extract information on the position of a joint and/or information on a pose from the information in operation 502 and may normalize and store the information. For example, the server 100 (e.g., the information analysis module 123) may normalize, process, and/or extract information for generating the machine learning model from the collected information, as shown in FIG. 6. For example, the information for generating the machine learning model acquired by the information analysis module 123 may include information on the position of a joint, information 611 on a pose, information 612 on a trajectory, and/or feature information 613.

For example, the information analysis module 123 may extract information on the positions of joints from an image of the expert and may extract information on a pose. The information analysis module 123 may recognize an object (e.g., an expert) from the image and may skeletalize the recognized object. The information analysis module 123 may detect information on the position of each skeleton (e.g., a shoulder, an arm, and an arm) during the specific motion in real time from the skeletalized model and may extract information on a pose of the object based on the detected information on the positions of the skeletons. In this case, the information analysis module 123 may extract information on the positions of different skeletons for the respective motions. For example, the information analysis module 123 may extract only the information on the position of the skeleton that is mainly used during the specific motion, and thus, may reduce the amount of data to reduce an operational burden of machine learning. For example, the information analysis module 123 may extract only the information on the position of a joint of the head, both shoulders, the waist, and both knees among a plurality of joints with respect to the golf swing among a plurality of motions.

In another example, the information analysis module 123 may identify information on angular velocity for each of 9 axes from the information on the angular velocity and may realize a trajectory of a motion or movement based on the identified information on angular velocity for each of 9 axes.

In another example, the information analysis module 123 may extract information on a plurality of evaluation levels for a plurality of respective features of a specific motion from a comment of an expert included in the evaluated information. The plurality of features may refer to various items for evaluating the specific motion. For example, when the specific motion is golf swing, the plurality of features may include a grip type, address, back swing cocking, down swing, impact, follow swing, and follow top. In this case, an evaluation level of the grip type may include "Strong", "Standard", and "Weak". The evaluation level of the address may include "Right foot back, "Normal", and "Left foot back". The evaluation level of the back swing cocking may include "Excessive", "Normal", and "Insufficient". The evaluation level of the top may include "Over", "Normal", and "Underformed". The evaluation level of the down swing may include "Lower Body", "Normal", and "Upper Body Only" in the case of the body and may include "Late Release", "Normal", and "Early Release" in the case of cocking. The evaluation level of the impact may include "Close+", "Close", "Normal", "Open", and "Open+" in the case of the face and may include "In2Out+", "In2Out", "Square", "Out2In", and "Out2In+" in the case of a path. The evaluation level of the follow swing may include "Follow", "Normal", and "Small". The evaluation level of the follow top may include "Not go over", "Go over", "*Normal", and "Chicken".

According to an embodiment, the server 100 may perform learning based on the information stored in operation 503 to generate a machine learning model. For example, the server 100 may perform machine learning based on various types of machine learning algorithms using the aforementioned information (e.g., the information on the position of a joint, the information 611 on a pose, the information 612 on a trajectory, and/or the feature information 613) as training data. The machine learning algorithm may include a linear regression algorithm, a polynomial regression algorithm, a classification analysis algorithm, a supervised learning algorithm such as logistic regression, a semi-supervised learning algorithm, an unsupervised learning algorithm, and a reinforcement learning algorithm, and various types of machine learning algorithms may be used without being limited to the description. The server 100 may perform machine learning using at least one of the information on the position of a joint, the information 611 on a pose, or the information 612 on a trajectory as input data 640, and information on respective evaluation levels for a plurality of features (e.g., a first feature 641 (e.g., a grip type) and a second feature 642 (e.g., address)) as output data. For example, the server 100 may apply a weight for one evaluation level (e.g., Strong", "Standard", and "Weak") of a specific feature (e.g., grip) corresponding to the information on the position of one joint, the information 611 on a pose, and the information 612 on one trajectory among the vast amount of accumulated information. Then, the server 100 may also continuously perform the operation of applying the weight for one evaluation level of a specific feature (e.g., grip) corresponding to information on the position of remaining joints, the information 611 on a pose, and the information 612 on a trajectory. The server 100 may generate a machine learning model 630 as the result of the operation of applying the weight, and the generated machine learning model 630 may include a matrix for calculating a weight for an evaluation level for a feature of a specific motion in response to the information on the position of each joint, the information on a pose, and the information on a trajectory. As a result, the machine learning model 630 may be set to output the evaluation level information for a plurality of features (e.g., a grip type, address, back swing cocking, down swing, impact, follow swing, and follow top) of a motion (e.g., golf swing) of the user in response to input of the information on a joint of the user or information on a trajectory as shown in FIG. 7. The evaluation level information is the same as the above description, and thus a description thereof is omitted.

As described above, the generated machine learning model may generate evaluation level information on exercise, sport, and/or competition (e.g., golf, and yoga) of various sports, but hereinafter, for convenience of description, a machine learning model for providing evaluation level information on golf will be exemplified.

3.2 Second Embodiment <Operation of Providing Evaluation Service Based on User Swing Image and Angular Velocity Information of Electronic Device 200>

The aforementioned operations of the smart practice system may be applied to the second embodiment, and a description thereof is omitted.

According to an embodiment, the electronic device 200 may download (or receive) the aforementioned program including the machine learning model 630 from the server 100 and may provide evaluation level information of a golf swing of a user based on the downloaded program. In this case, the electronic device 200 may implement a 3D object for indicating golf swing of the user and may also effectively provide information on the golf swing.

Figure 8:
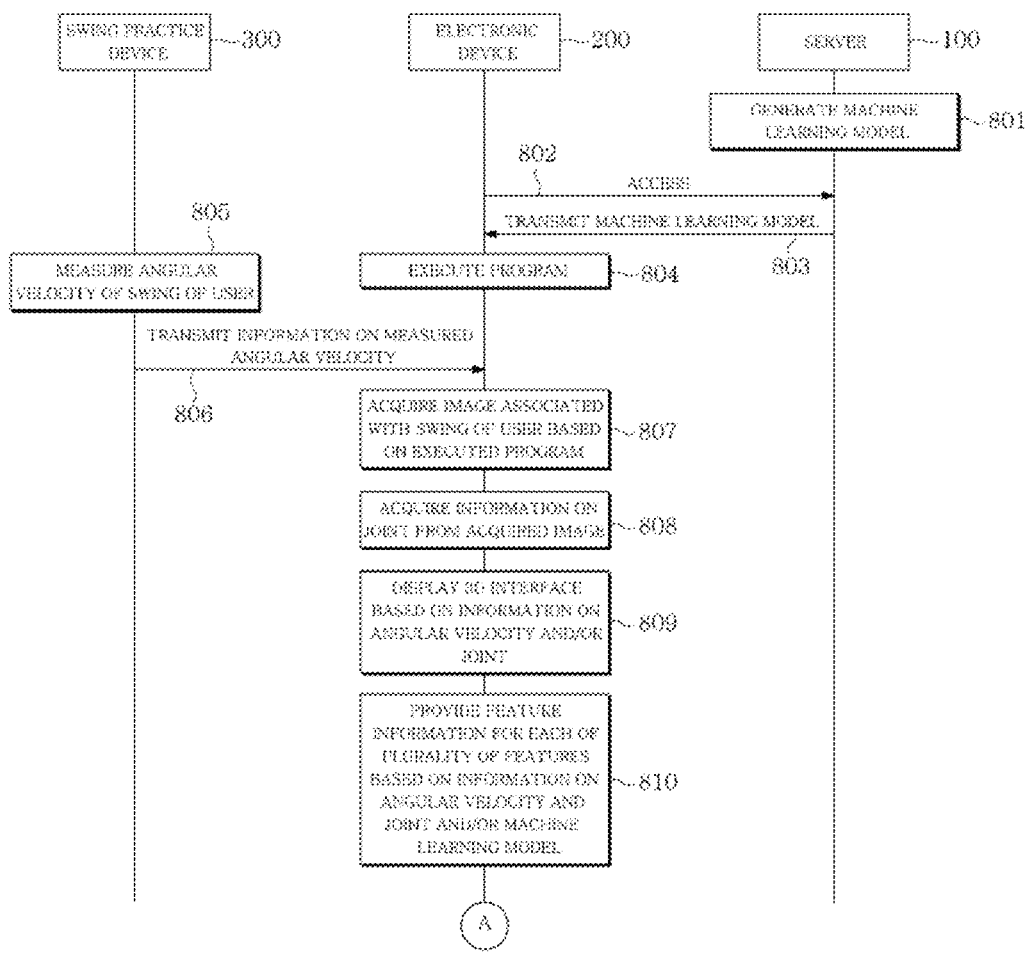
FIG. 8 is a flowchart for explaining an example of an operation of a smart practice system according to an embodiment of the present application.

FIG. 8 is a flowchart for explaining an example of an operation of a smart practice system according to an embodiment of the present application. According to various embodiments, operations of the smart practice system are not limited to the operations illustrated in FIG. 8 and may be performed in a different order from the illustrated order. According to various embodiments, a greater or smaller number of operations may be performed than the operations of the smart practice system shown In FIG. 8 or at least one operation may be performed. Hereinafter, FIG. 8 will be described with reference to FIGS. 9 to 11.

Figure 9:
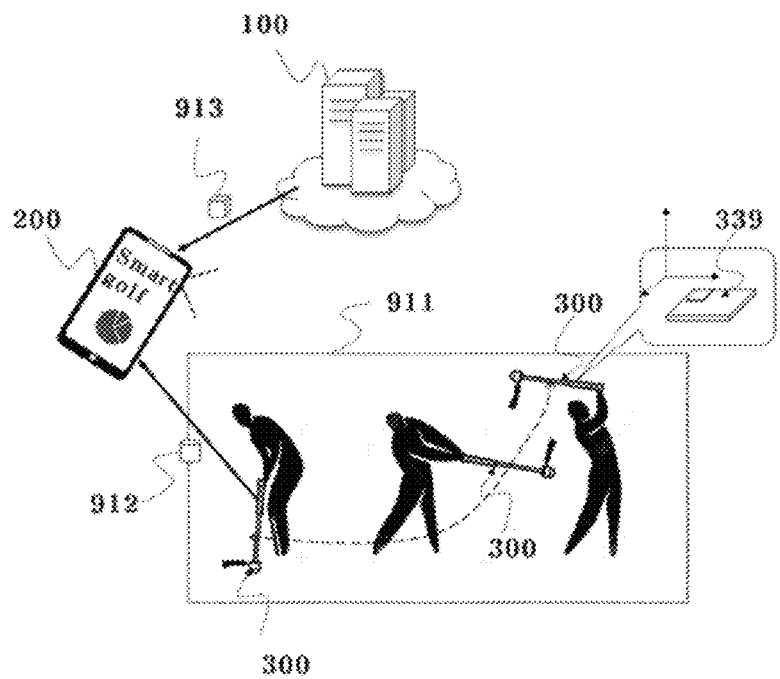
FIG. 9 is a diagram for explaining an example of an operation of analyzing a golf swing of a user of a smart practice system according to an embodiment of the present application.
Figure 10:
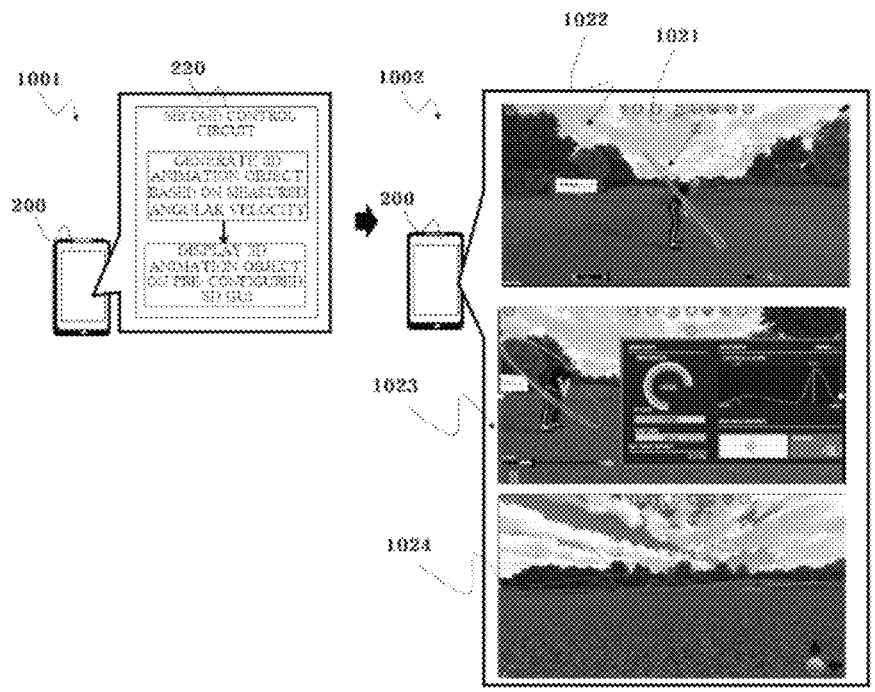
FIG. 10 is a diagram for explaining an example of an operation of implementing and providing a 3D object indicating a golf swing of a user of an electronic device according to an embodiment of the present application.
Figure 11:
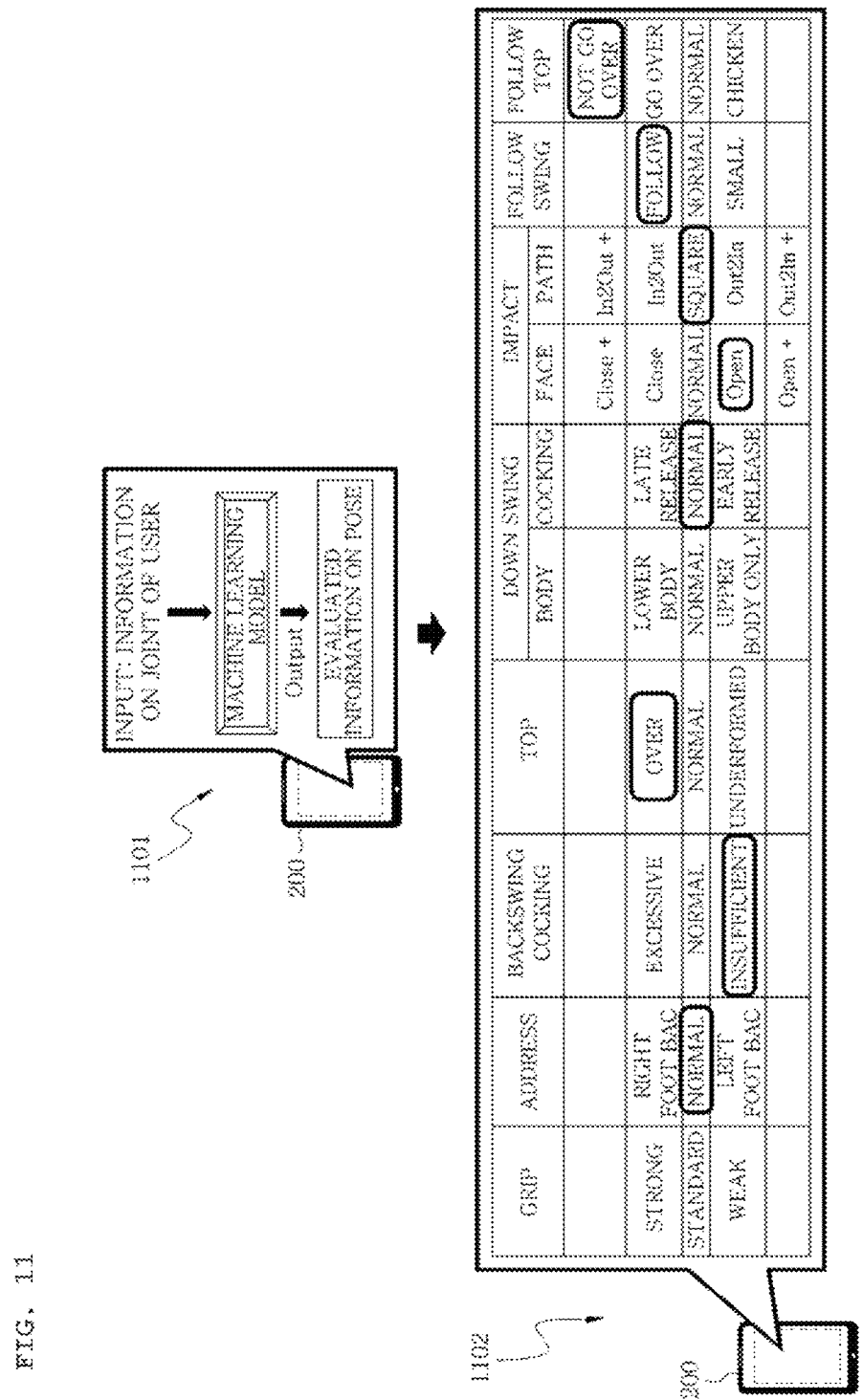
FIG. 11 is a diagram for explaining an example of an operation of providing evaluated information (or evaluation level information) of a golf swing of the user based on a machine learning model of an electronic device according to an embodiment of the present application.

FIG. 9 is a diagram for explaining an example of an operation of analyzing a golf swing of a user of a smart practice system according to an embodiment of the present application. FIG. 10 is a diagram for explaining an example of an operation of implementing and providing a 3D object indicating the golf swing of the user of the electronic device 200 according to an embodiment of the present application. FIG. 11 is a diagram for explaining an example of an operation of providing evaluated information (or evaluation level information) of the golf swing of the user based on the machine learning model 630 of the electronic device 200 according to an embodiment of the present application.

According to an embodiment, the server 100 may generate a machine learning model in operation 801. For example, the server 100 may accumulate big data (e.g., an image of a specific motion or movement, information on angular velocity using the swing practice device 300 during the specific motion or movement, and evaluated information) of the specific motion or movement (e.g., swing motion) of a plurality of experts (or professional athletes) (e.g., golf players), way process the big data, and may generate the machine learning model 630 using the processed information (e.g., the information on the position of a joint, the information 611 on a pose, the information 612 on a trajectory, and/or the feature information 613 of FIG. 6) as training data. As described above with reference to FIG. 7, the machine learning model 630 may be set to output the evaluation level information for a plurality of features (e.g., a grip type, address, back swing cocking, down swing, impact, follow swing, and follow top) of a motion (e.g., golf swing) of the user in response to input of the information on a joint of the user or information on a trajectory. For example, the operation of the server 100 and the evaluation level information obtained via evaluation by the machine learning model 630 are the same as the above description in the "First Embodiment", and a description thereof will be omitted.

According to an embodiment, the electronic device 200 may access the server 100 in operation 802, may receive a machine learning model from the server 100 in operation 803, and may execute a program in operation 804. For example, a user who wants to receive remote evaluation of golf swing may access the server 100 using the electronic device 200. As described above, when authenticating the user using the interface provision module 121, the server 100 may provide a program 913 including the machine learning model 630 to the electronic device 200 as shown in FIG. 9. The program may be implemented to provide evaluated information (or evaluation level information) of the golf swing of the user using the machine learning model 630 and may also be implemented to configure a 3D graphical user interface (GUI) indicating the swing of the user.

According to an embodiment, the swing practice device 300 may measure angular velocity of the swing of the user in operation 805 and may transmit information on the angular velocity measured in operation 806 to the electronic device 200. For example, the user way perform a golf swing 911 using the swing practice device 300 after executing the program, and the swing practice device 300 may transmit information 912 on the angular velocity detected using the aforementioned swing detector 340 to the electronic device 200. In this case, the swing practice device 300 may receive a wake-up signal from the electronic device 200 based on execution of the program and may begin to be driven in response to the received wake-up signal. The swing practice device 300 may output vibration and/or sound at the same time as driving and may notify the user that it is possible to practice golf swing. The electronic device 200 may calculate the information on a trajectory during swing of the swing practice device 300 based on the information 912 on the angular velocity.

According to an embodiment, the electronic device 200 may acquire an image associated with swing of the user based on the program executed in operation 807. For example, the electronic device 200 may drive the photographing device 250 based on execution of the program and may photograph the golf swing 911 of the user using the driven photographing device 250. The electronic device 200 may acquire a plurality of frame images for an entire time period from start to finish of a golf swing using the photographing device 250. In this case, when a partial time period of the entire time period of the golf swing 911 is not photographed, the electronic device 200 may make a request to the user for re-swing and re-photographing. For example, as the comparison result of the plurality of frame images acquired depending on the photographing result, the electronic device 200 may determine that a partial time period of the entire time period of the golf swing 911 is not photographed when a time period in which a trajectory of swing is interrupted occurs. In this case, the electronic device 200 may display a notification message for re-swing and re-photographing on a program execution screen.

According to an embodiment, the electronic device 200 may acquire information on a joint from the image acquired in operation 808. For example, the electronic device 200 may extract an object from the image of the golf swing of the user and may skeletalize the extracted object to generate a skeleton model. The electronic device 200 may acquire information on the position of the skeleton during the golf swing of the user from the skeleton model. In this case, the electronic device 200 may also extract only the information on the position of the skeleton of the user, which is mainly used for each specific motion. For example, the electronic device 200 may also extract only the information on the position of the skeleton of the user, which is mainly used during golf swing (e.g., only the information on the positions of joints of the head, both shoulders, the waist, and both knees among a plurality of joints may be extracted). Thus, an operational burden of the electronic device 200 way be reduced by reducing the amount of data used when the machine learning model 630 is used.

According to an embodiment, the electronic device 200 may display a 3D interface based on information on the angular velocity and/or the joint in operation 809. For example, the electronic device 200 (e.g., the second control circuit 220) may generate a 3D animation object 1021 based on the information on the measured angular velocity and/or joint as shown in 1001 to 1002 of FIG. 10 based on the executed program and may display the 3D animation object 1021 on a pre-configured 3D GUI 1022. The 3D animation object 1021 may refer to a 3D avatar of a user who performs motion corresponding to the golf swing 911 performed by the user. Hereinafter, examples of an operation of generating the 3D animation object 1021 of the electronic device 200 and an operation of displaying the 3D animation object 1021 on the pre-configured 3D GUI 1022 will be described.

According to an embodiment, the electronic device 200 may extract an object (that is, a user) from an image captured by photographing a golf swing based on execution of the program. The 3D avatar way be generated by extracting feature information (e.g., facial expression and height) associated with the user from the extracted object and applying pre-input or pre-acquired additional information (e.g., age of the user) associated with the user. The electronic device 200 may generate motion information of the 3D avatar based on information on the position of a joint during a golf swing motion. The motion information of the 3D avatar may be information for controlling each joint of the 3D avatar to move at a predetermined speed in a predetermined direction during a predetermined time period. In other words, the motion information of the 3D avatar may be information for controlling the 3D avatar to perform movement corresponding to the golf swing that is actually performed by the user. The electronic device 200 may calculate information on a trajectory of the golf swing based on the angular velocity and may generate swing trajectory animation information based on the information on a trajectory of the golf swing. The electronic device 200 may generate the 3D animation object 1021 by applying the motion information and the swing trajectory animation information of the 3D avatar to the generated 3D avatar. As shown in 1002 of FIG. 10, the 3D animation object 1021 may include an indicated trajectory contained in the trajectory animation information while the 3D avatar moves together with the 3D avatar that moves based on the motion information. In this case, the indicated trajectory may be displayed in different colors depending on a swing direction (e.g., a backward direction or a forward direction). The electronic device 200 may identify a time period in which the swing practice device 300 swings in a backward direction and a time period in which the swing practice device 300 swings in a forward direction during analysis of angular velocity and may configure the trajectory animation information to change the color of a trajectory corresponding to each time period. When displaying the 3D animation object 1021, the electronic device 200 way display evaluated information (or evaluation level information) together as shown in 1023 of FIG. 10, or the electronic device 200 may calculate a driving distance of a golf ball and a trajectory of the golf ball based on the information on a trajectory of the golf swing and the information on the position of a joint and may also display the calculated information as shown in 1024 of FIG. 10.

According to an embodiment, the electronic device 200 may configure the 3D GUI environment 1022 for displaying the 3D animation object 1021 as shown in 1002 of FIG. 10. The 3D GUI environment 1022 may be pre-configured and may be selected as one GUI environment according to user selection among a plurality of 3D GUI environments. The GUI environments may include a field, various environments (e.g., tree, cloud, and sky). The electronic device 200 may adjust the features (e.g., weather, the position of the sun, and the position of clouds) of components included in the GUI environment by applying the currently detected contextual information (e.g., weather, and time) to the selected GUI environment.

Without being limited to FIG. 10, when the electronic device 200 is configured as a VW/AR glass but not a terminal, a 3D AR/VR environment may be generated, and the generated 3D animation object may also be configured and displayed.

According to an embodiment, the electronic device 200 may provide evaluated information for each of the plurality of features based on angular velocity, information on a joint, and the machine learning model 630 in operation 810. For example, as shown in 1101 of FIG. 11, the electronic device 200 may input at least one of the swing information on a trajectory or the information on the position of a joint of the user, which is calculated from the information on angular velocity, to the machine learning model 630. As described above, the machine learning model 630 may apply a weight for an evaluation level on the feature of a specific motion corresponding to the input swing information on a trajectory or information on the position of a joint of the user based on a matrix for calculating the weight for the evaluation level on the feature of the specific motion in response to the information on the position of each joint, the information on a pose, and the information on a trajectory. As a result, as shown in 1101 of FIG. 11, the machine learning model 630 may output evaluated information (e.g., evaluation level information) of a swing pose. For example, as shown in 1102 of FIG. 11, the machine learning model 630 may output evaluation levels (e.g., Standard, Normal, Insufficient, Over, Normal, Open, Square, Follow, and Not go over) on a plurality of respective features for golf swing (e.g., features such as grip type, address, back swing cocking, down swing, impact, follow swing, and follow top). The electronic device 200 may display the output evaluated information (e.g., evaluation levels on the plurality of respective features of golf swing) on the program execution screen. As described above, the electronic device 200 may also display the output evaluated information (e.g., evaluation levels on the plurality of respective features of golf swing) together with the 3D animation object 1021.

According to an embodiment, the server 100 may accumulate rewards for the user in response to provision of the evaluated information. The reward may be used as a cost for using an evaluated information providing service of the program. For example, the user may pay a predetermined cost (e.g., cash payment, or card payment) whenever the evaluated information is provided as described above using the program downloaded from the server 100. In this case, the reward may be accumulated depending on a difference value between evaluation levels of respective features (e.g., features such as grip type, address, back swing cocking, down swing, impact, follow swing, and follow top) of the golf swing of the user provided by the electronic device 200 and a preset optimum value (e.g., Standard and Normal). For example, as the difference between the evaluation levels of the respective features for the user and the present optimum value is reduced, the reward may be accumulated for the user. For example, the electronic device 200 may identify the back swing cocking feature of golf swing of the user in previous evaluated information to be "Insufficient", and when the back swing cocking feature of golf swing of the user in the current evaluated information is identified to be "Normal", the electronic device 200 may identify that a difference between "Normal" as an optimum value of the back swing cocking feature and evaluation level (e.g., Insufficient to Normal) of the back swing cocking feature of the user is reduced. Thus, the electronic device 200 may request the server 100 to accumulate the reward for the user based on reduction in the difference. The server 100 may store information on the reward accumulated for the user and may use the information using a method of subtracting the stored reward as a point when the user makes payment using the program in the future.

According to another embodiment, the electronic device 200 may provide an interface for selecting one expert among a plurality of experts to whom the evaluated information is to be provided based on execution of the program and may receive selection of one expert among the plurality of experts from the user. The electronic device 200 may input the information on a specific motion of the user (e.g., at least one of the swing information on a trajectory or the information on the position of a joint of the user, calculated from the information on angular velocity) to provide the evaluated information as described above using the machine learning model trained based on the information (e.g., image information and angular velocity data of the expert) provided from the selected expert. In this case, the server 100 may also provide a predetermined cost to the expert based on the use of the evaluated information.

3.3. Third Embodiment <Provision of Service for Guiding Golf Swing Based on Feedback of User for Swing Motion Evaluated Information>

The aforementioned operations of the smart practice system may be applied to the third embodiment, and a description thereof is omitted.

According to an embodiment, the electronic device 200 may provide evaluation level information for golf swing of the user based on the machine learning model 630 as described above. The electronic device 200 may receive feedback for changing evaluation level information (e.g., Insufficient) of the specific feature (e.g., back swing cocking) of golf swing to other level information (e.g., Normal) from the user and may provide guide information for improving the golf swing of the user based on the received feedback.

Figure 12:
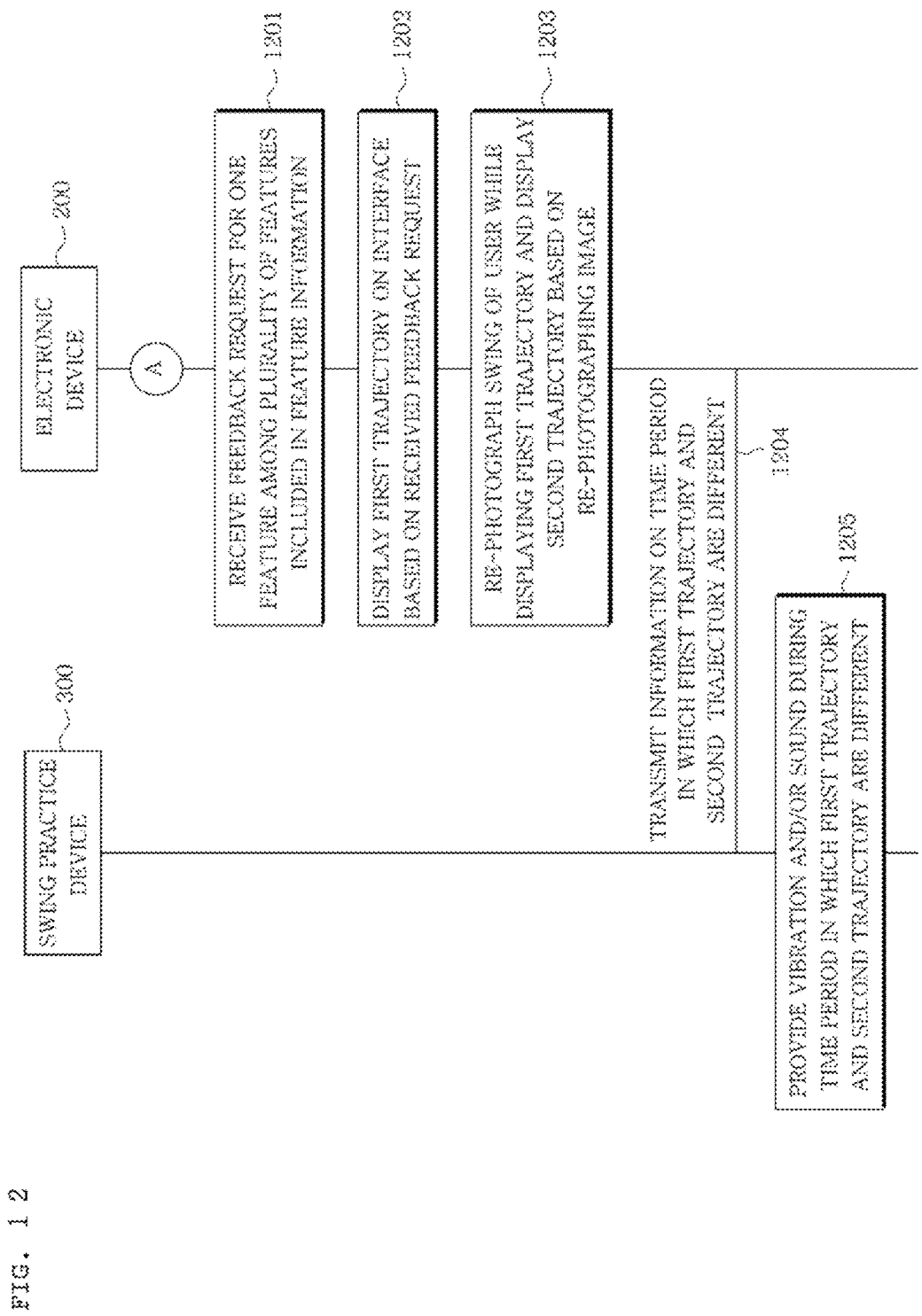
FIG. 12 is a flowchart for explaining another example of an operation of a smart practice system according to an embodiment of the present application.

FIG. 12 is a flowchart for explaining another example of an operation of a smart practice system according to an embodiment of the present application. According to various embodiments, operations of the smart practice system are not limited to the operations illustrated in FIG. 12 and may be performed in a different order from the illustrated order. According to various embodiments, a greater or smaller number of operations may be performed than the operations of the smart practice system shown in FIG. 12 or at least one operation may be performed. Hereinafter, FIG. 12 will be described with reference to FIGS. 13 to 14.

Figure 13:
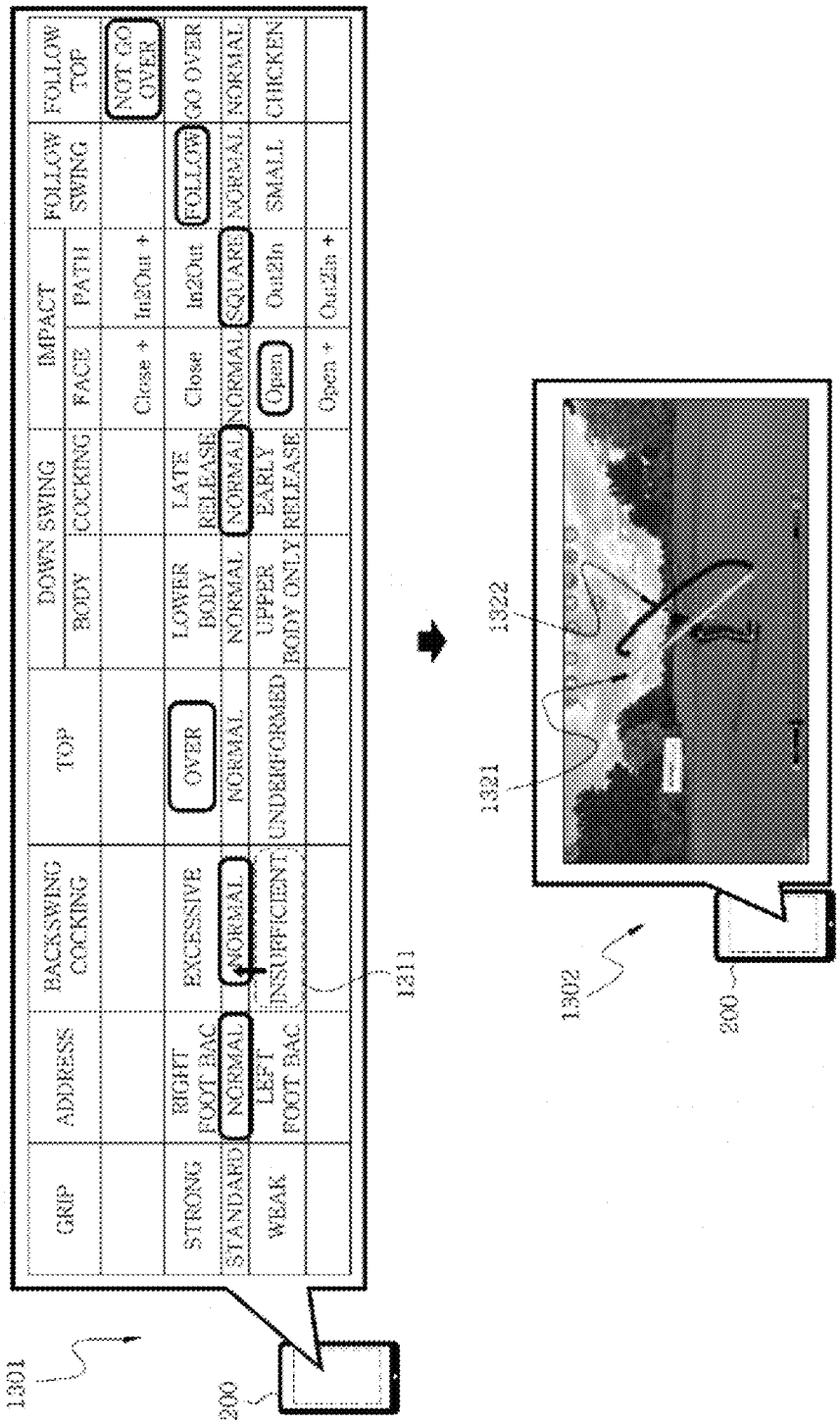
FIG. 13 is a diagram for explaining an example of an operation of receiving feedback from a user of an electronic device and an operation of providing a guide service based on the feedback according to an embodiment of the present application.
Figure 14:
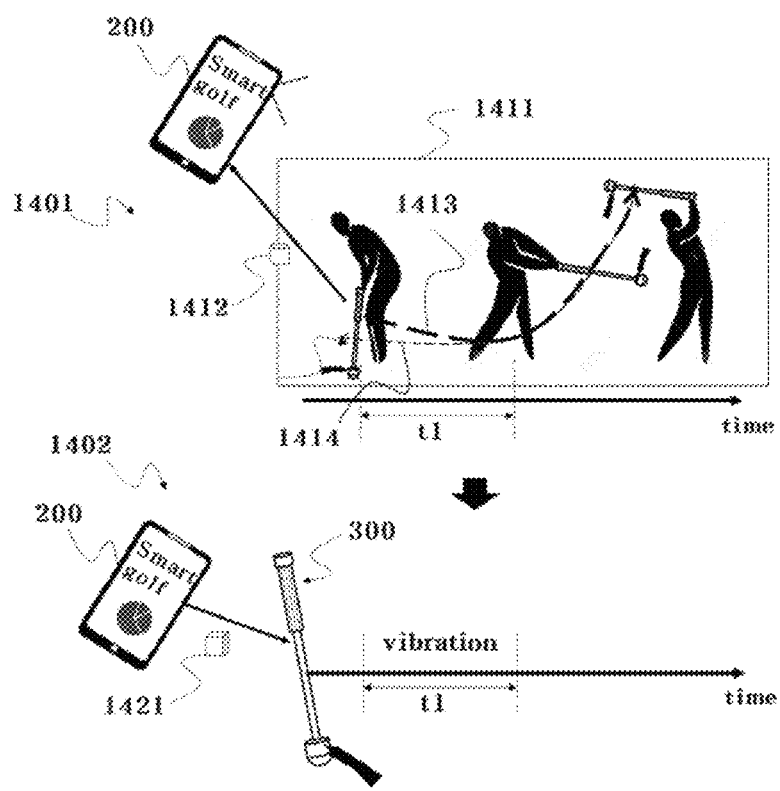
FIG. 14 is a diagram for explaining another example of an operation of providing guidance to the user of an electronic device according to an embodiment of the present application.

FIG. 13 is a diagram for explaining an example of an operation of receiving feedback from a user of the electronic device 200 and an operation of providing a guide service based on the feedback according to an embodiment of the present application. FIG. 14 is a diagram for explaining another example of an operation of providing guidance to the user of the electronic device 200 according to an embodiment of the present application.

Hereinafter, a repeated description of the operation of the server 100, the electronic device 200, and the swing practice device 300 described above in the second embodiment will be omitted.

According to an embodiment, the electronic device 200 may receive a request for feedback for one feature among a plurality of features contained in the evaluated information in operation 1201. For example, as shown in 1301 of FIG. 13, the electronic device 200 may receive feedback for changing evaluation level information (e.g., Insufficient) of the specific feature (e.g., back swing cocking) to other level information (e.g., Normal) while displaying the evaluation level information on a plurality of features (e.g., grip type, address, back swing cocking, down swing, impact, follow swing, and follow top) of motion (e.g., golf swing) of the user. For example, the electronic device 200 may receive touch of the user for evaluation level information "Insufficient" of back swing cocking and may receive input of dragging to evaluation level information "Normal" as a level that the user wants to change (or to enhance) in the state in which the touch is maintained.

According to an embodiment, the electronic device 200 may display a first trajectory on an interface based on the received feedback request in operation 1202, as shown 1302 of FIG. 13. For example, the electronic device 200 may extract motion information or swing trajectory information from a pre-generated 3D animation object. The electronic device 200 may identify specific information (e.g., swing trajectory information) corresponding to a feature (e.g., back swing cocking) in which a current evaluation level is changed, from the extracted motion information or the swing trajectory information. The electronic device 200 may identify information on a partial time period (e.g., a time period during back swing) of the identified specific information (e.g., swing trajectory information) to be changed based on an evaluation level (e.g., Normal) of the changed feature and may generate an updated 3D animation object by changing information on the partial time period (e.g., a time period during back swing) from the identified specific information (e.g., swing trajectory information). Without being limited to the description, when the changed feature as well as a swing trajectory is associated with the motion information, the electronic device 200 may also generate the updated 3D animation object by changing the motion information.

According to an embodiment, the electronic device 200 may re-photograph the swing of the user and may display a second trajectory based on an image obtained via re-photographing while displaying the first trajectory in operation 1203. In response to feedback of the user from the electronic device 200, the user may perform golf swing 1411 again as shown in 1401 of FIG. 14. The electronic device 200 may re-acquire information 1412 of the image and the angular velocity according to the golf swing 1411 of the user and may newly generate a 3D animation object based thereon. The operation of generating a 3D animation object of the electronic device 200 may be the same as the above description in the second embodiment, and thus a repeated description thereof is omitted. As shown in 1302 of FIG. 13, the electronic device 200 may display a swing trajectory 1321 of the newly generated 3D animation object based on the re-photographed golf swing 1411 of the user, to be described below, and a new trajectory 1322 of the updated 3D animation object together, and the user may easily improve their golf swing.

According to an embodiment, the electronic device 200 may transmit information on a time period in which the first trajectory and the second trajectory are different to the swing practice device 300 in operation 1204. For example, as shown 1401 of FIG. 14, the electronic device 200 may identify a time period t1 with different swing trajectories based on the comparison result between the swing trajectory 1321 of the newly generated 3D animation object based on a re-photographed golf swing of the user and the new trajectory 1322 of the updated 3D animation object. The electronic device 200 may transmit information 1421 on the time period t1 with different swing trajectories that are identified in real time to the swing practice device 300.

According to an embodiment, the swing practice device 300 may provide vibration and/or sound during the time period in which the first trajectory and the second trajectory are different in operation 1205. As shown in 1402 of FIG. 14, the swing practice device 300 may provide sound or vibration in real time during the time period t1 based on the time period t1 with different received swing trajectories. Thus, a swing section to be corrected by the user who currently performs golf swing may be easily identified.

An embodiment of the present application may provide an electronic device and an operating method for accurately learning a specific motion (e.g., golf swing) using a remote method while reducing learning time, capital, and effort by generating a machine learning model based on big data about a specific motion from an expert or a professional athlete of one specific sport and providing a feedback service for the user based on the generated machine learning model.

An embodiment of the present application may provide an electronic device and an operating method for accurately learning a specific motion (e.g., golf swing) by receiving feedback for portions of motion desired to be improved from the user during feedback and providing guidance based on the received feedback.

It will be appreciated by persons skilled in the art that the effects that could be achieved with the various embodiments are not limited to what has been particularly described hereinabove and other advantages of the present disclosure will be more clearly understood from the above detailed description.

What is claimed is:

1. An operating method of an electronic device, comprising:
   receiving a program including a machine learning model generated by performing machine learning using, as training data, information on a plurality of skeletons associated with a specific motion of an expert and/or a professional athlete associated with a specific sport, information on a plurality of angular velocities associated with the specific motion, and/or a plurality of pieces of evaluated information associated with the specific motion, which are accumulated in a server, from the server, the plurality of pieces of evaluated information including information on evaluation levels for a plurality of respective features associated with the specific motion, and the machine learning model being set to output first evaluation levels for the plurality of features associated with the specific motion in response to input of at least one of information on a first skeleton or information on first angular velocity;
   executing the program and receiving information on second angular velocity for the specific motion of a user of the electronic device from a swing practice device based on execution of the program;
   photographing the specific motion of the user based on execution of the program and acquiring information on a second joint during the specific motion of the user based on a plurality of images acquired based on the photographing;
   displaying a 3D graphical user interface (GUI) including a 3D animation object based on the information on the second angular velocity and/or the information on the second joint; and
   displaying information on second evaluation levels on the plurality of features associated with the specific motion output from the machine learning model on the 3D GUI in response to input of the information on the second angular velocity and/or the information on the second joint to the machine learning model,
   wherein the plurality of features includes at least one of a grip type, address back swing cocking, top, down swing, impact, follow swing, or follow top when the specific motion is a golf swing, and
   wherein information on second evaluation levels on the plurality of features represents one of three or more levels for each of the plurality of features.

2. The operating method according to claim 1, further comprising:
   determining whether a time period in which a trajectory of the golf swing is interrupted occurs based on a comparison result of the plurality of images acquired based on the photographing; and
   displaying a message for re-photographing the golf swing upon determining that the time period in which the trajectory of the golf swing is interrupted occurs.

3. The operating method according to claim 2, further comprising:
   extracting an image of the user from the plurality of images;
   generating a skeleton model of the user based on the image of the user;
   extracting information on a position of at least some joints associated with the golf swing among a plurality of joints included in the skeleton model, the at least some joints including joints of head, both shoulders, waist, and both knees among the plurality of joints;
   extracting feature information associated with the user from the plurality of images, and generating a 3D avatar corresponding to the user based on the extracted feature information;
   generating motion information of the 3D avatar based on the information on a position of the second joint, the motion information of the 3D avatar is information for controlling each joint of the 3D avatar to move at a predetermined speed in a predetermined direction during a predetermined time; calculating information on a trajectory of the golf swing based on the information on the second angular velocity and generating swing trajectory animation information based on the information on the trajectory of the golf swing; and
   generating the 3D animation object including the 3D avatar to which the motion information is applied and the swing trajectory animation information.

4. The operating method according to claim 3, further comprising:
   acquiring contextual information; and
   applying the contextual information to features of components included in the 3D graphical user interface (GUI), the contextual information including at least one of weather or time;
   while displaying information on second evaluation levels on the plurality of features, receiving input for changing a third evaluation level to a fourth evaluation level for one feature among the plurality of features; and
   changing the 3D animation object to a first 3D animation object based on the input for changing and displaying the first 3D animation object.

5. The operating method according to claim 4, further comprising:
   identifying the swing trajectory animation information corresponding to the one feature to be changed among the motion information associated with the 3D animation object and the swing trajectory animation information;
   changing the identified swing trajectory animation information to first swing trajectory animation information based on the changed fourth evaluation level; and
   generating the first 3D animation object based on the motion information and the first swing trajectory animation information.

* * * * *